Oct. 6, 1970  D. M. TEAGUE ET AL  3,532,359
INFLATABLE DEVICE
Filed July 22, 1968  2 Sheets-Sheet 1
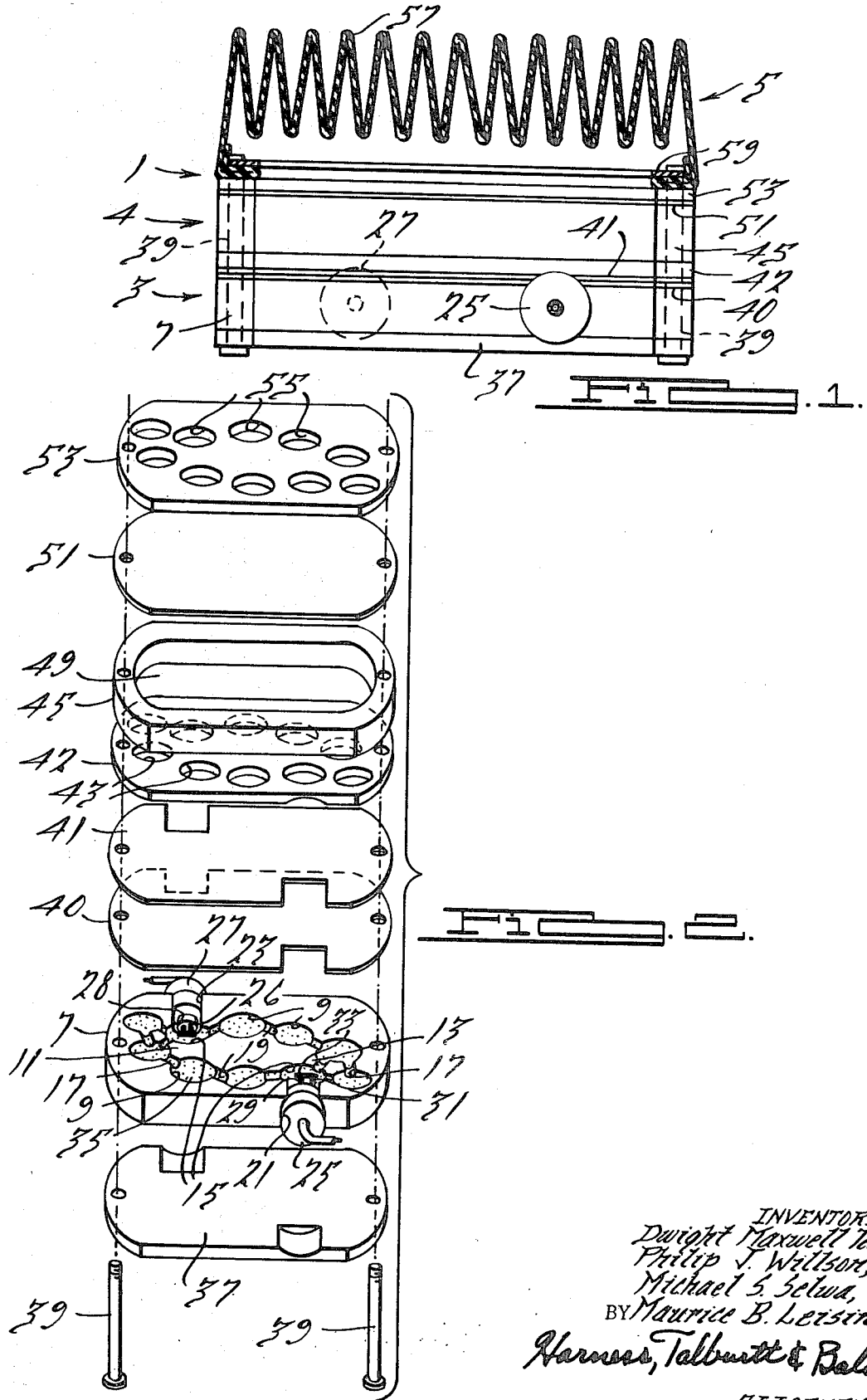
INVENTORS.
Dwight Maxwell Teague,
Philip J. Willson,
Michael S. Selwa,
BY Maurice B. Leising.
Harness, Talburtt & Baldwin
ATTORNEYS.

Oct. 6, 1970  D. M. TEAGUE ET AL  3,532,359
INFLATABLE DEVICE
Filed July 22, 1968  2 Sheets-Sheet 2
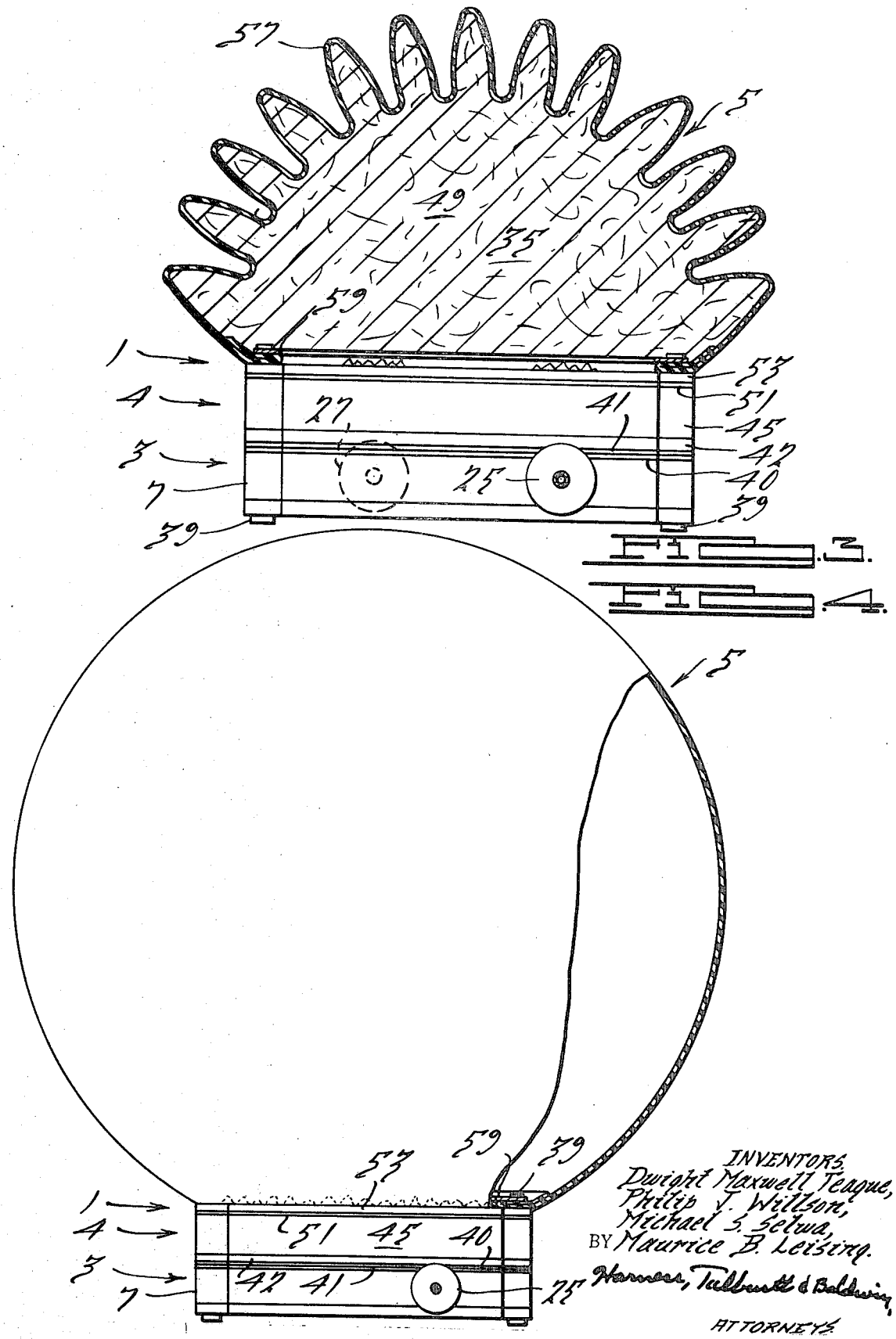
INVENTORS
Dwight Maxwell Teague,
Philip J. Willson,
Michael S. Setwa,
BY Maurice B. Leising.
Harness, Tulbustl & Baldwin
ATTORNEYS

United States Patent Office 3,532,359
Patented Oct. 6, 1970

3,532,359
INFLATABLE DEVICE
Dwight Maxwell Teague, Detroit, Philip J. Willson, Royal
Oak, Michael S. Selwa, Troy, and Maurice B. Leising,
Clawson, Mich., assignors to Chrysler Corporation,
Highland Park, Mich., a corporation of Delaware
Filed July 22, 1968, Ser. No. 746,560
Int. Cl. B60r 21/00
U.S. Cl. 280—150                                          21 Claims

ABSTRACT OF THE DISCLOSURE

Gas generator having a folded inflatable bag connected thereto, the generator having a plurality of pockets confining propellant. Electrical ignition devices ignite the propellant in two pockets first to release gas for deploying or partially expanding the folded bag. Propellant filled channels connect the two initially ignited propellant pockets to the remaining pockets for igniting the latter to relase gas for inflating the bag to a desired pressure. A sublimable, vaporizable or decompresable powdered material capable of absorbing heat is provided in the device to absorb the heat produced by the burning propellant.

BACKGROUND OF THE INVENTION

This invention relates to a gas generator and inflatable bag device, and more particularly to such a device particularly adapted for use in automotive vehicles and is an improvement of the device disclosed in U.S. patent application Serial No. 746,333, filed July 22, 1968.

Many types of gas source or generator and inflatable bag devices particularly adapted for use in automobile vehicles are known. For example, some of these devices employ a sealed cylinder of compressed gas connected directly or by a conduit to an inflatable bag mounted on the interior of the vehicle. A sensing device is conventionally provided for sensing rapid deceleration or change in velocity of the vehicle. Upon a predetermined change in vehicle velocity, such as upon impact with another object, the sensing device causes a signal to be sent to an actuating device for breaking the seal on cylinder to release the gas to the bag. The latter inflates and provides a cushion against which an occupant may be thrown by the impact.

Many of the known types of devies of this class require rather complicated and large components. The cylinder, for example, containing the compressed gas, is often relatively bulky. Moreover, the bags of these devices could rupture during inflation due to frictional interlocking of one portion of the bag with another portion thereof. If an ignitable propellant is used to release gas for inflating the bag, the gases produced may heat the bag to such a high temperature that minor burning of an occupant in contact with the bag could result or the heat could heat the bag and cause bag rupture. The present invention overcomes many of the disadvantages of the known devices.

BRIEF SUMMARY OF THE INVENTION

Briefly this invention comprises an inflatable bag and a gas generator, the latter having a primary or initial supply of propellant for partially expanding the bag, a second supply of propellant, ignited subsequent to the first supply, for continuing the inflation of the bag, and a supply of heat absorbing material to absorb heat from the gases released by the ignited propellant.

One of the primary objects of this invention is to provide a gas generating and inflatable bag device which is adapted to fully inflate the bag very repidly and without heating the same to a very high temperature after a signal requesting inflation is transmitted to the device.

Another object of this invention is to provide a device of the class described which generates the gas at a relatively low pressure and prevents such gas from heating the bag to a high temperature.

A further object of this invention is to provide a device of the type described which permits as gas generator and the inflatable bag to be located in close proximity to one another.

Still another object of this invention is to provide a device such as described which inhibits bag rupture, particularly during initial inflating of the bag from a normally collapsed position.

Another object of this invention is to provide a device of the class described which is relatively compact in construction.

A still further object of this invention is to provide a device of the general type described which is simple and economical in construction and efficient in operation.

Other objects and advantages will become apparent as the description progresses.

BRIEF DESCRIPTION OF THE DRAWINGS

Referring to the drawings, in which one of various possible embodiments of this invention is illustrated, FIG. 1 is a side elevation, certain parts being shown in section, of a constructed in accordance with this invention;

FIG. 2 is an expanded fragmentary view of FIG. 1;

FIG. 3 is a view generally similar to FIG. 1, showing the bag during the initial stages of inflation; and FIG. 4 is a view generally similar to FIG. 3 showing the final stages of bag inflation.

Like parts are indicated by corresponding reference characters throughout the several views of the drawings.

DESCRIPTION OF THE PREFERRED EMBODIMENT

Referring now to the drawings, a device constructed in accordance with this invention is generally indicated at 1. It includes a gas generator 3, a coolant chamber 4 and an inflatable bag 5.

Gas generator 3 includes a main body member 7 having a plurality of cavities or pockets 9 therein. As shown, the confining means or pockets 9 are formed into two groups or sets generally designated 11 and 13. However, the number of groups and pockets may vary considerably without departing from the spirit of this invention.

As shown, each group 11 and 13 includes five pockets 9 with one pocket 15 being designated as the primary ignition pocket for the group and with the other four secondary ignition pockets 9 being arranged around the primary ignition pocket. Propellant confining channels or grooves 17 are provided in body 7 to join each of the pockets 9 in each group of pockets with both the primary ignition pocket 15 and with the next adjacent secondary ignition pocket. In addition, each group of pockets is interconnected to the other group of pockets by propellant confining channels or grooves 19 so that propellant, to be described hereinafter, ignited in one group of pockets may cause ignition of the propellant in all pockets.

Body 7 has recessed or bores 21 and 23 in which ignition devices 25 and 27 are located. The ignition devices may take various forms, such as fuses, ignition squibs, or electrical igniters. As shown, the ignition devices are formed of electrical igniters having extension portions 26 in smaller recesses 28 and two wire electrodes 29 and 31 joined together at the outer ends thereof by a tungsten filament 33.

The electrodes 29 and 31 and filament 33 of each igniter extend into the primary ignition pocket of the respective group of pockets.

Each of the pockets 9 and 15 and the channels 19 are provided with a supply of propellant material 35 adapted, when ignited, to burn rapidly. Many sophisticated or exotic propellants such as rocket propellants are adapted to burn rapidly only when ignited under relatively highly pressurized conditions. Inasmuch as it is not desirable or practical to utilize highly pressurized chambers in devices of the type herein described, such exotic propellants have not proved practical or reliable. However, the well-known propellant, commonly referred to as black powder, will burn very rapidly under relatively low pressures. As is well known, black powder is composed of a mixture of the following materials in approximately the following amounts:

| | Percent |
|---|---|
| Potassium nitrate | 75 |
| Charcoal | 15 |
| Sulfur | 10 |

Generally speaking, the smaller the granule size of the particles the faster the burning rate of the mixture.

A lower plate 37 is attached to body 7 by fasteners 39 extending upwardly through the plate and the body. Extending across the upper surface of body 7 over all of the propellant filled pockets is a diaphragm 40, such as an aluminum foil diaphragm, for example. A second diaphragm 41, such as a polyethylene diaphragm, for example, overlies diaphragm 40 and underlies an upper plate 42 having holes 43 therethrough vertically aligned with the pockets in body 7. The diaphragms should be adapted to rupture when the pressure within each pocket reaches a relatively low predetermined value, such as, for example, 150 p.s.i. This pressure value of 150 p.s.i. is only examplary and the rupture pressure value could be higher or lower if desired.

A confining member or ring 45 is located on top of plate 42 and forms part of a chamber 47 for holding a supply of sublimable, vaporizable or decomposable material 49 capable of absorbing heat. Because the time in which the heat must be absorbed is very short, as explained hereinafter, many materials would not seem satisfactory. For example, ammonium carbonate has at moderate temperatures, a relatively slow vaporization rate. In particular it has been found that ammonium carbonate, for example, at a temperature of 400° F., sublimes or decomposes at a rate of approximately 2.5% (weight loss) per minute. However, it has been found that when subjected to the temperature and pressure of the gases released upon burning black powder in the environment disclosed herein, decomposition and heat absorption of ammonium carbonate increases to such an extent that the outside temperature of the bag is prevented from attaining a temperature which would produce minor burning of an occupant.

A third diaphragm 51, such as a polyethylene diaphragm, covers the chamber 47 and is held against ring 45 by a plate 53. Plate 53 has a plurality of holes 55 therein to permit the egress of propellant and material 49.

Bag 5 is folded in a manner to provide a plurality of folds 57 therein located side-by-side and extending generally away from the generator. The outer edge or edges of the bag are folded double and secured to the periphery of the plate 51 by a ring member 59 clamped on the folded edges by fasteners 39. The bag is preferably formed of a flexible woven sheet material combined with a rubber material. As will be made apparent hereinafter, the folding of the bag in the manner substantially permits free expansion of the bag without frictional interlocking of the bag material during initial stages of inflation.

Assuming the bag is in the position shown in FIG. 1, operation of the device of this invention is as follows:

Electrical current is supplied to each of the ignition devices 23 and 25 through the wires connected thereto from a source (not shown) such as an automotive vehicle battery, for example. The current would be supplied in response to a signalling device adapted, for example, to sense an abrupt change in velocity of the vehicle, such as upon impact with another object.

When the current passes through the filaments 33, the powder in each of the primary ignition pockets 15 ignites and begins burning. As used herein, the terms burn or burning mean a reaction which produces or releases gas and heat. A pressure of 150 p.s.i., for example, is rapidly attained, i.e., within a few milliseconds, and this pressure ruptures the diaphragms 40 and 41 over the area of the primary ignition pockets. The powder in the primary ignition pockets which has not burned by the time the diaphragms 40 and 41 rupture, is propelled or thrown, due to the 150 p.s.i. gas in the pockets, first into the chamber 47 where it mixes with the material 49 and then through diaphragm 51 into the bag and continues to burn. The material 49 absorbs a significant portion of the heat produced by the burning propellant, both in the chamber 47 and in the bag 5. Moreover, when the material 49 vaporizes, it releases additional gas for inflating the bag. This initial delivery of gases and burning powder into the bag causes the latter to be thrown into a partially expanded position as generally shown in FIG. 3. Thus, the bag is thrown into this partially expanded position by considerably less than the full force which would be exerted thereon if all of the powder-filled pockets were ignited simultaneously. If the latter condition occurred, two or more of the folds of the bag might be forced together inhibiting bag expansion and resulting in unusually instantaneous pressure which could rupture the bag. The powder may, depending on its burning rate and time of ignition, continue to burn after inflation to maintain the bag in such condition and prevent deflation due to cooling of the gases.

While the bag is being thrown into the partially expanded position, the powder in the channels 17 from each of the primary ignition pockets burns and ignites the powder in pockets 9 surrounding each of the primary pockets. The diaphragm portions covering such remaining pockets are quickly burst and the powder in such other pockets is also thrown through chamber 47 into the bag as the expanding gases expand the bag. The powder thrown into the bag continues to burn to create gas for continuing the inflation of the bag until the latter reaches a desired pressure condition such as shown in FIG. 4. At the same time the material 49 which is mixed with the burning propellant vaporizes and absorbs heat therefrom. As described previously, the absorption of heat causes the material 49 to release gas for inflating the bag and achieving the desired pressure. The ability of the material 49 to do this may permit a reduction in the amount of propellant necessary to achieve the desired pressure in the bag.

If one of the ignition devices 25 should fail to ignite the propellant in the associated pocket 15, the pockets in the associated group of pockets will still be ignited by the propellant in the channels 19 interconnecting the two groups 11 and 13 of pockets.

The total time period between passing current to the ignition devices and complete inflation of the bag is very short, such as 20–30 milliseconds, for example.

It has been found that black powder may, when used in the manner described without a material 49, create a temperature in the bag of approximately 2700° F. and may cause the exterior of the bag to attain an outside surface temperature of as much as 300° F. By using a sublimable, vaporizable or decomposable material 49 it has been found that the outside temperature of the bag can be reduced to approximately 120° F. without adversely affecting the inflation of the bag.

In addition to the material 49 mentioned previously, i.e., ammonium carbonate, it is believed that other materials could be effectively employed, such as for example, ammonium bicarbonate, ammonium chloride, camphor, ammonium acid carbonate, hexamethylenetetramine, melamine, napthalene, phthalic anhydride, water, liquid coolant, sodium bicarbonate, hydrated calcium sulfate, salicycle acid, alum, and phthalimide. The material 49 should be capable of storage and should be relatively stable. It should produce a fair volume of gas which is not too corrosive and is relatively non-toxic. Most of the materials set forth above have the additional advantages of being storable as a powder.

The device may be placed in various locations on the interior of an automative vehicle, such as on the upper end of the steering column, for example. If a vehicle impact is sensed, the bag can be rapidly inflated to provide a cushion against which a vehicle occupant may be thrown.

As mentioned previously, the device of this invention preferably employs the use of a propellant, such as black powder, which is adapted to burn at very rapid rate under relatively low pressures. Moreover, by providing for an initial ignition and burning of a part of the total propellant, followed by ignition and burning of the remaining propellant, with burning of all propellant continuing after the latter is thrown into the interior regions of the bag, rupturing of the bag may be avoided. Furthermore, the material 49 inhibits or limits the transfer of heat from the propellant gases to the walls of the bag 5.

In view of the foregoing, it will be seen that the several objects and advantages of the invention are achieved.

Although only one embodiment of the invention has been disclosed and described, it is apparent that other embodiments and modifications of the invention are possible within the scope of the appended claims.

We claim:

1. Inflated device comprising a gas generator, an inflatable bag connected to said gas generator, said gas generator having confining means, a plurality of supplies of propellant in said confining means, ignition means for igniting said propellant, said supplies of propellant, when ignited, releasing gases for inflating said bag to a substantially fully inflated condition in a plurality of stages, said confining means including means for preventing escape of propellant and gases from said confining means into said bag for a period of time after ignition of said propellant, said means for preventing escape of propellant and gases being adapted to permit escape of said propellant and gases into said bag after said period of time, and means in said device for mixing with said propellant for preventing some of the heat from said ignited propellant from being transferred to the walls of said bag.

2. Inflatable device as set forth in claim 1 wherein said means for preventing transfer of some of the heat from said ignited propellant to the walls of said bag comprises a supply of material capable of absorbing heat.

3. Inflatable device comprising an inflatable bag, means for inflating said bag, said means comprising ignitable propellant producing heat when ignited and during inflation of said bag, and dispersible material adjacent said propellant during ignition of the latter for preventing some of the heat produced during ignition of said propellant and inflation of said bag from being transferred to the wall of said bag, said means for inflating said bag including means for providing gas for inflating said bag in a predetermined multistage manner.

4. Inflatable device as set forth in claim 3 wherein said means for preventing transfer of some of the heat from said ignited propellant to the walls of said bag comprises a supply of material capable of absorbing heat.

5. Inflatable device comprising a gas generator and an inflatable bag connected to said gas generator and having a plurality of folds extending generally away from said gas generator, said gas generator having first confining means for holding a first supply of propellant, a first supply of propellant in said first confining means, second confining means for holding a second supply of propellant, a second supply of propellant in said second confining means, ignition means for igniting said first supply of propellant, said first supply of propellant, upon ignition, releasing gases into said bag to partially inflate the latter and begin opening said folds, said second supply of propellant being ignited subsequent to said first supply of propellant, said second supply of propellant, upon ignition, releasing gases to inflate said bag to a substantially fully inflated position, dispersible means in said device adjacent said propellant for preventing some of the heat from said ignited propellant from being transferred to the walls of said bag.

6. Inflatable device comprising a gas generator and an inflatable bag connected to said gas generator, said gas generator having a first pocket for holding a first supply of propellant, a first supply of propellant in said first pocket, a second pocket for holding a second supply of propellant, a second supply of propellant in said second pocket, a supply of material capable of absorbing heat adjacent said propellant, ignition means for igniting said first supply of propellant, said first supply of propellant, upon ignition, escaping from said first pocket and releasing gases into said bag to partially inflate the latter, means for igniting said second supply of propellant subsequent to the ignition of said first supply of propellant, said second supply of propellant, upon ignition, escaping from said second pocket and releasing gases to inflate said bag to a desired pressure, said supply of material being forced into said bag by the gases released by said ignited first and second supplies of propellant and absorbing heat from said ignited propellant.

7. Inflatable device as set forth in claim 6 wherein said means for igniting said first supply of propellant comprises an electrical filament through which electrical current may be passed.

8. Inflatable device as set forth in claim 6 wherein said propellant comprises approximately 75% potassium nitrate, 15% charcoal and 10% sulfur.

9. Inflatable device comprising a gas generator and an inflatable bag connected to said gas generator, said gas generator having first confining means for holding a first supply of propellant, ignition means connected to said generator for igniting said first supply of propellant, second confining means for holding a second supply of propellant, a second supply of propellant in said second confining means, third confining means for holding a third supply of propellant, said third confining means interconnecting said first and second confining means, rupturable means covering said first and second confining means normally to prevent the egress of propellant therefrom, fourth confining means over said first, second and third confining means for holding a supply of material capable of absorbing heat, a supply of material capable of absorbing heat in said fourth confining means, said rupturable means covering said first confining means rupturing when the pressure of the gases released by the ignited propellant in said first confining means reaches a predetermined value, the gases released by the ignited propellant in said first confining means inflating said bag to a partially inflated condition, said propellant in said first confining means igniting said propellant in said third confining means which ignites said propellant in said second confining means, the gases released by the ignited propellant in said second and third confining means causing the means covering said second confining means to rupture and causing said bag to be inflated to a desired pressure, said supply of material being forced into said bag by the gases released by said ignited supplies of propellant and absorbing heat from said ignited propellant.

10. Inflatable device as set forth in claim 9 wherein said bag, prior to inflation, has a plurality of folds extending generally away from said gas generator.

11. Inflatable device as set forth in claim 10 wherein said means for igniting said first supply of propellant comprises an electrical filament through which electrical current may be passed.

12. Inflatable device comprising a gas generator and an inflatable bag connected to said gas generator, said gas generator having first confining means for holding a first supply of propellant, a first supply of propellant in said first confining means, second confining means for holding a second supply of propellant, a second supply of propellant in said second confining means, a supply of material capable of absorbing heat adjacent said propelent, ignition means for igniting said first supply of propellant, said first supply of propellant, upon ignition, releasing gases into said bag to partially inflate the latter, said second supply of propellant being ignited subsequent to said first supply of propellant, said second supply of propellant, upon ignition, releasing gases to inflate said bag to a desired pressure, said supply of material being forced into said bag by the gases released by said ignited first and second supplies of propellant and absorbing heat from said ignited propellant, said bag, prior to inflation, having a plurality of folds extending generally away from said gas generator.

13. Inflatable device comprising a gas generator and an inflatable bag connected to said gas generator, said gas generator having first confining means for holding a first supply of propellant, a first supply of propellant in said first confining means, second confining means for holding a second supply of propellant, a second supply of propellant in said second confining means, a supply of material capable of absorbing heat adjacent said propellant, ignition means for igniting said first supply of propellant, said first supply of propellant, upon ignition, releasing gases into said bag to partially inflate the latter, said second supply of propellant being ignited subsequent to said first supply of propellant, said second supply of propellant, upon ignition, releasing gases to inflate said bag to a desired pressure, said supply of material being forced into said bag by the gases released by said ignited first and second supplies of propellant and absorbing heat from said ignited propellant, said gas generator comprising a body, said first confining means comprising at least one pocket in said body, said second confining means including at least one pocket in said body and channel means in said body extending between said pocket of said first confining means and said pocket of said second confining means, third confining means for holding said supply of material comprising ring means connected to said body, and diaphragms on opposite sides of said ring means to hold said supply of material therein.

14. Inflatable device as set forth in claim 13 wherein said bag, prior to inflation, has a plurality of folds extending generally away from said gas generator.

15. Inflatable device comprising a gas generator and an inflatable bag connected to said gas generator, said gas generator having first confining means for holding a first supply of propellant, a first supply of propellant in said first confining means, second confining means for holding a second supply of propellant, a second supply of propellant in said second confining means, a supply of material capable of absorbing heat adjacent said propellant, ignition means for igniting said first supply of propellant, said first supply of propellant, upon ignition, releasing gases into said bag to partially inflate the latter, said second supply of propellant being ignited subsequent to said first supply of propellant, said second supply of propellant, upon ignition, releasing gases to inflate said bag to a desired pressure, said supply of material being forced into said bag by the gases released by said ignited first and second supplies of propellant and absorbing heat from said ignited propellant, said first confining means comprising at least two primary ignition pockets in said generator.

16. Inflatable device comprising a gas generator and an inflatable bag connected to said gas generator, said gas generator having first confining means for holding a first supply of propellant, a first supply of propellant in said first confining means, second confining means for holding a second supply of propellant, a second supply of propellant in said second confining means, a supply of material capable of absorbing heat adjacent said propellant, ignition means for igniting said first supply of propellant, said first supply of propellant, upon ignition, releasing gases into said bag to partially inflate the latter, said second supply of propellant being ignited subsequent to said first supply of propellant, said second supply of propellant, upon ignition, releasing gases to inflate said bag to a desired pressure, said supply of material being forced into said bag by the gases released by said ignited first and second supplies of propellant and absorbing heat from said ignited propellant, said material being ammonium carbonate.

17. Inflatable device comprising a gas generator and an inflatable bag connected to said gas generator, said gas generator having first confining means for holding a first supply of propellant, a first supply of propellant in said first confining means, second confining means for holding a second supply of propellant, a second supply of propellant in said second confining means, a supply of material capable of absorbing heat adjacent said propellant, ignition means for igniting said first supply of propellant, said first supply of propellant, upon ignition, releasing gases into said bag to partially inflate the latter, said second supply of propellant being ignited subsequent to said first supply of propellant, said second supply of propellant, upon ignition, releasing gases to inflate said bag to a desired pressure, said supply of material being forced into said bag by the gases released by said ignited first and second supplies of propellant and absorbing heat from said ignited propellant, said gas generator comprising a body, said first confining means comprising at least one pocket in said body, said second confining means including a plurality of pockets in said body and a plurality of channels in said body extending between said pocket of said first confining means and each pocket of said plurality of pockets, third confining means for holding said supply of material comprising a ring member connected to said body, and diaphragms on opposite sides of said ring to hold said supply of material therein.

18. Inflatable device as set forth in claim 17 wherein said bag, prior to inflation, has a plurality of folds extending generally away from said gas generator.

19. Inflatable device as set forth in claim 18 wherein said propellant comprises approximately 75% potassium nitrate, 15% charcoal and 10% sulfur.

20. Inflatable device as set forth in claim 19 wherein said material is ammonium carbonate.

21. Inflatable device comprising a gas generator, an inflatable bag connected to said gas generator, said gas generator having confining means, propellant in said confining means, said propellant being adapted to undergo a reaction, means for causing said propellant to react, said propellant, when reacting, producing heat and releasing gases for inflating said bag to a substantially fully inflated condition, means for causing said propellant to release gas in a manner such that said bag is inflated to a fully inflated condition in a plurality of stages, one stage being the initial deployment and partial inflation of said bag and another stage being the inflation of said bag to a desired pressure, said confining means including means for preventing escape of propellant and gases from said confining means into said bag for a period of time after said propellant begins to react, said means for preventing escape of propellant and gases being adapted to permit escape of said propellant and gases into said bag after said period of time, and means in said device for mixing with said propellant for preventing some of the heat produced by said propellant undergoing reaction from being transferred to the walls of said bag.

(References on following page)

References Cited

UNITED STATES PATENTS

| | | | |
|---|---|---|---|
| 373,529 | 11/1887 | Lombard | 102—40 |
| 2,558,756 | 7/1951 | Jackson et al. | 23—281 |
| 2,850,291 | 9/1958 | Ziccardi | 280—150 |
| 3,066,014 | 11/1962 | White | 23—281 |
| 3,403,625 | 10/1968 | Jacobson et al. | 102—38 |
| 3,425,712 | 2/1969 | Berryman | 280—150 |
| 3,450,414 | 6/1969 | Kobori | 280—150 |

KENNETH H. BETTS, Primary Examiner

U.S. Cl. X.R.

23—281